United States Patent [19]

Ohno et al.

[11] Patent Number: 4,646,158
[45] Date of Patent: Feb. 24, 1987

[54] LIQUID CRYSTAL TELEVISION RECEIVER

[75] Inventors: Hideshi Ohno, Sayama; Akira Tsuzuki, Tokyo; Toshiaki Oguchi, Kodaira; Shigeru Futami, Tokorozawa; Masaru Yoshida, Higashimurayama; Satoshi Kimura, Sayama; Hiroyuki Uematsu, Higashimurayama; Kouichi Nakajima, Tokyo; Katuo Matsuyama, Tokyo; Hiroya Sakamoto, Tokyo; Yasuhiko Takayama, Koganei; Osamu Matsumura, Chofu; Toshio Sakaguchi, Tokyo, all of Japan

[73] Assignee: Citizen Watch Co., Ltd., Tokyo, Japan

[21] Appl. No.: 783,564

[22] Filed: Oct. 3, 1985

[30] Foreign Application Priority Data

Oct. 5, 1984 [JP] Japan .................................. 59-209473

[51] Int. Cl.$^4$ .............................................. H04N 5/64
[52] U.S. Cl. .................................... 358/236; 358/241; 358/254; 340/784

[58] Field of Search ............... 358/236, 254, 255, 230, 358/241; 340/784

[56] References Cited

U.S. PATENT DOCUMENTS

| | | | |
|---|---|---|---|
| 4,403,216 | 9/1983 | Yokoi | 358/236 |
| 4,443,819 | 4/1984 | Funada | 358/236 |
| 4,561,044 | 12/1985 | Ogura | 358/241 |

FOREIGN PATENT DOCUMENTS

| | | | |
|---|---|---|---|
| 208528 | 11/1984 | Japan | 340/784 |
| 2147765 | 5/1985 | United Kingdom | 340/784 |

Primary Examiner—Tommy P. Chin
Attorney, Agent, or Firm—Birch, Stewart, Kolasch & Birch

[57] ABSTRACT

A liquid crystal television receiver has a first housing containing a television receiving circuit, a mirror mounted on an upper portion thereof, and a battery for driving the television receiving circuit, a second housing containing a liquid crystal display panel, and a third housing containing a light emitting element. The first, second and third housings are pivotally connected with each other at rear portions thereof, respectively.

6 Claims, 12 Drawing Figures

LIQUID CRYSTAL TELEVISION RECEIVER

BACKGROUND OF THE INVENTION

The present invention relates to a television receiver employed with a liquid crystal display panel as a display device, and more particularly to a liquid crystal color television receiver.

In a portable liquid crystal color television receiver, the liquid crystal display panel is provided with a plurality of picture elements, each of which comprises color filters of the three primary colors (red, green, blue) which are arranged in a pattern. The amount of light transmitted through each picture element is controlled by a liquid crystal layer which serves as a shutter to reproduce various colors. Therefore, in order to obtain good, bright picture quality with excellent contrast, it is necessary to provide a lighting device. However, since the lighting device consumes large amounts of electric power, the life of the battery is shortened. In order to solve this problem, a battery having a large capacity could be used, or a decrease in the luminance of the lighting device may be adopted. However, the former causes an increase in size and thickness of the television receiver, and the latter deteriorates the picture quality.

SUMMARY OF THE INVENTION

An object of the present invention is to eliminate the above described disadvantages of a liquid crystal television receiver.

Another object of the present invention is to provide a liquid crystal television receiver which is available at any time and anywhere.

According to the present invention, there is provided a liquid crystal television receiver comprising, a first housing containing a television receiving circuit manipulating means for operating the television receiving circuit, a battery for driving the television receiving circuit, and a mirror mounted on an upper portion thereof; a second housing pivotally connected to the first housing and containing a liquid crystal display panel, a driving and controlling circuit for the liquid crystal display panel; and a third housing pivotally connected to the second housing and containing a light emitting element, and a driver for the light emitting element.

In an aspect of the present invention, the liquid crystal display panel is arranged to transmit light from outside such as solar light or room light, and the first, second and third housings are connected to each other at rear portions thereof, respectively. Further, the third housing is arranged to cover the liquid crystal display panel.

These and other objects and features of the present invention will become more apparent from the following description with reference to the accompanying drawings.

DESCRIPTION OF THE PREFERRED EMBODIMENT

Figure 1:
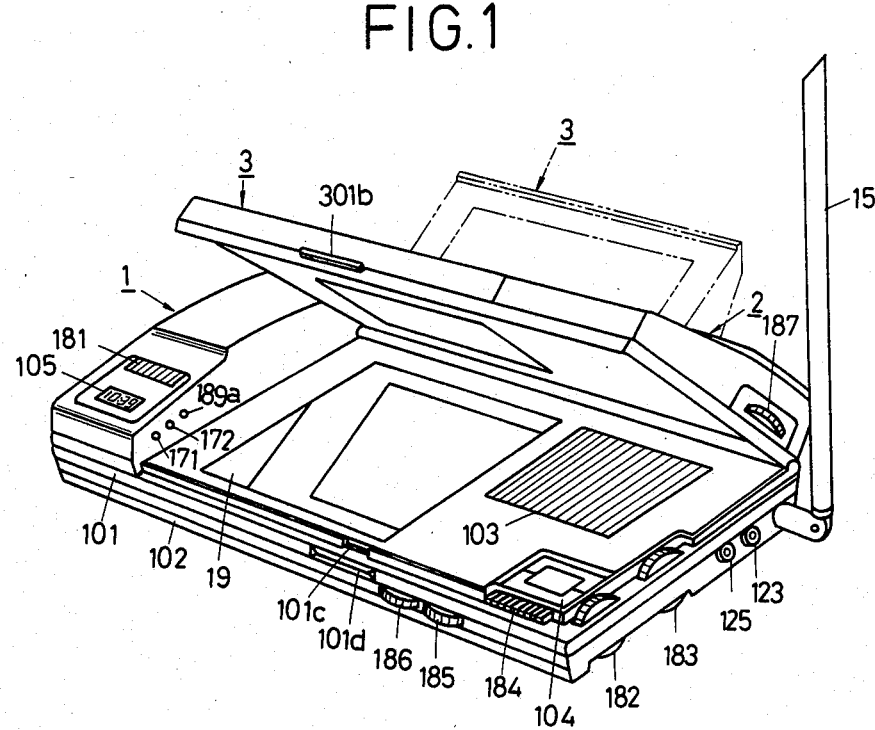
FIG. 1 is a perspective view of a liquid crystal television receiver when the television is being watched.
Figure 2:
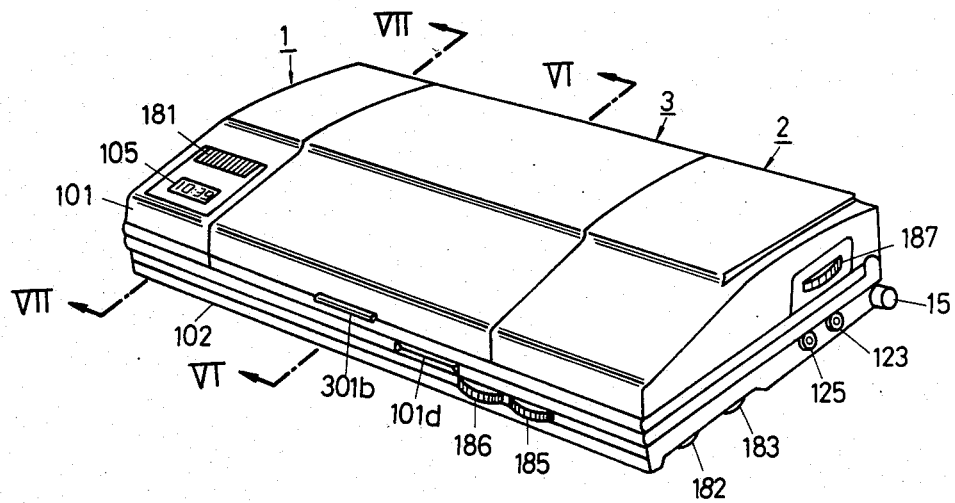
FIG. 2 is a perspective view of the television receiver when it is being carried.

Referring to FIGS. 1 and 2, a liquid crystal color television receiver according to the present invention comprises a housing 1 made of plastics comprising an upper frame 101 and a lower frame 102. A mirror 19 is mounted on a central portion of the upper frame 101. A loudspeaker 103 of an audio device 16 (FIG. 3) is provided on an upper portion of the right side of the upper frame 101. In the front side of the speaker, a channel tuning indicator 104 for displaying a receiving channel is provided. A time display 105 of a watch module 17 (FIG. 3) is provided in a front portion of the left side of the upper frame 101. A power switch knob 181 is provided adjacent to the time display 105.

External manipulating means of the television receiver, including channel tuning dial 182, volume controlling dial 183, band selecting switch knob 184, and color adjusting dials 185, 186 are provided adjacent to the channel tuning indicator 104. A receiving rod antenna 15 is disposed on the right side of a rear portion of the lower frame 102. When the antenna is not used, it is inserted into the housing 1. Since the antenna is provided in the rear portion, manipulation involving the pulling out and the inserting of the rod antenna 15 can be easily done and the antenna can be moved easily in a large range of directions.

A panel block 2 containing a liquid crystal display panel 21 (FIG. 4) and a driving control circuit 22 is pivotally connected to the rear portion of the housing 1 at the top thereof and is adapted to cover the upper frame 101 except for a left side portion.

A lighting block 3 containing a fluorescent lamp 31 and a lighting circuit 32 (FIG. 5) is pivotally connected to the rear side of the top of the panel block 2 corresponding to the center of the housing 1 and is adapted to cover the panel block 2 except for a right side portion. When surrounding outside light is sufficiently bright, a user opens the lighting block 3 as shown in dashed line of FIG. 1 and the outside light is transmitted through the panel block 2.

Figure 3:
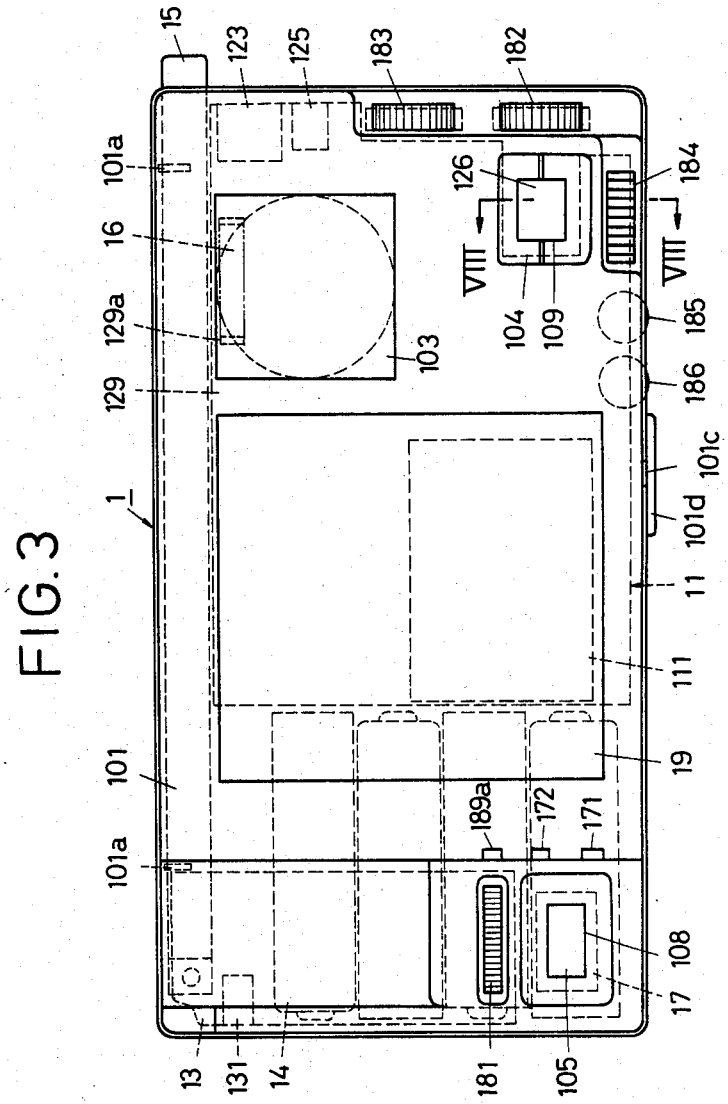
FIG. 3 is a plan view of a housing.
Figure 10:
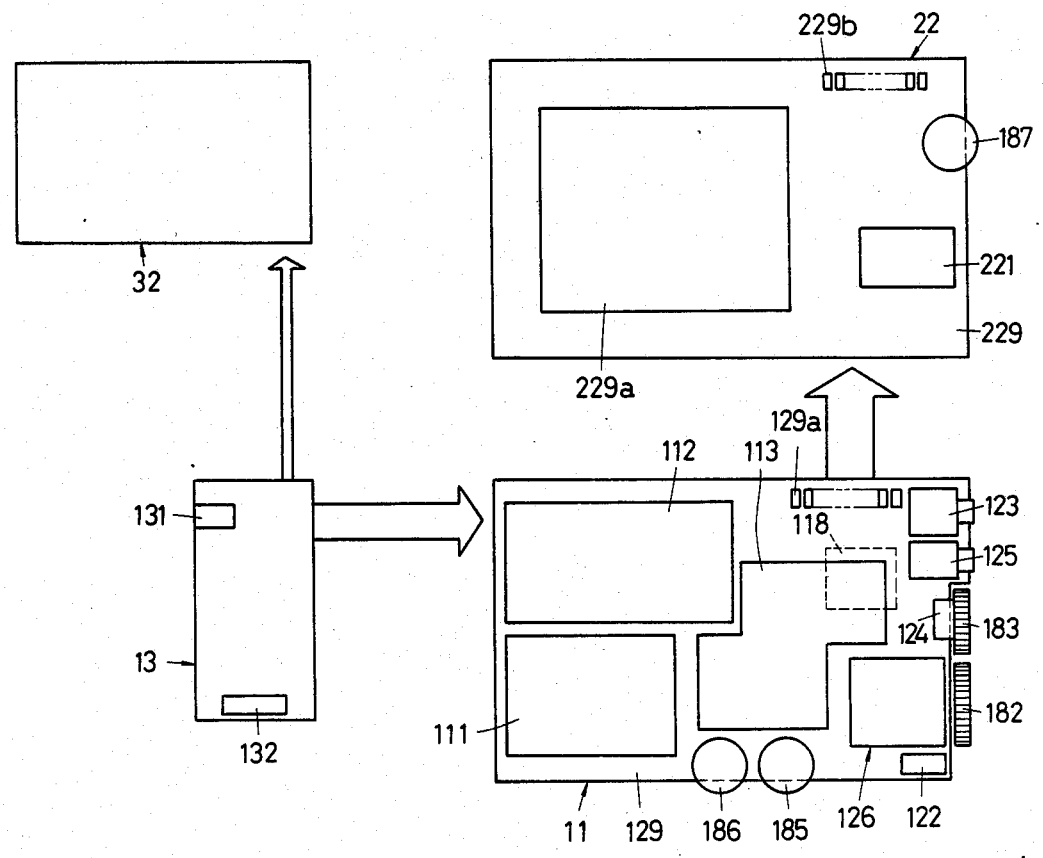
FIG. 10 is a schematic diagram showing the relationships between the main circuit means.
Figure 11A:
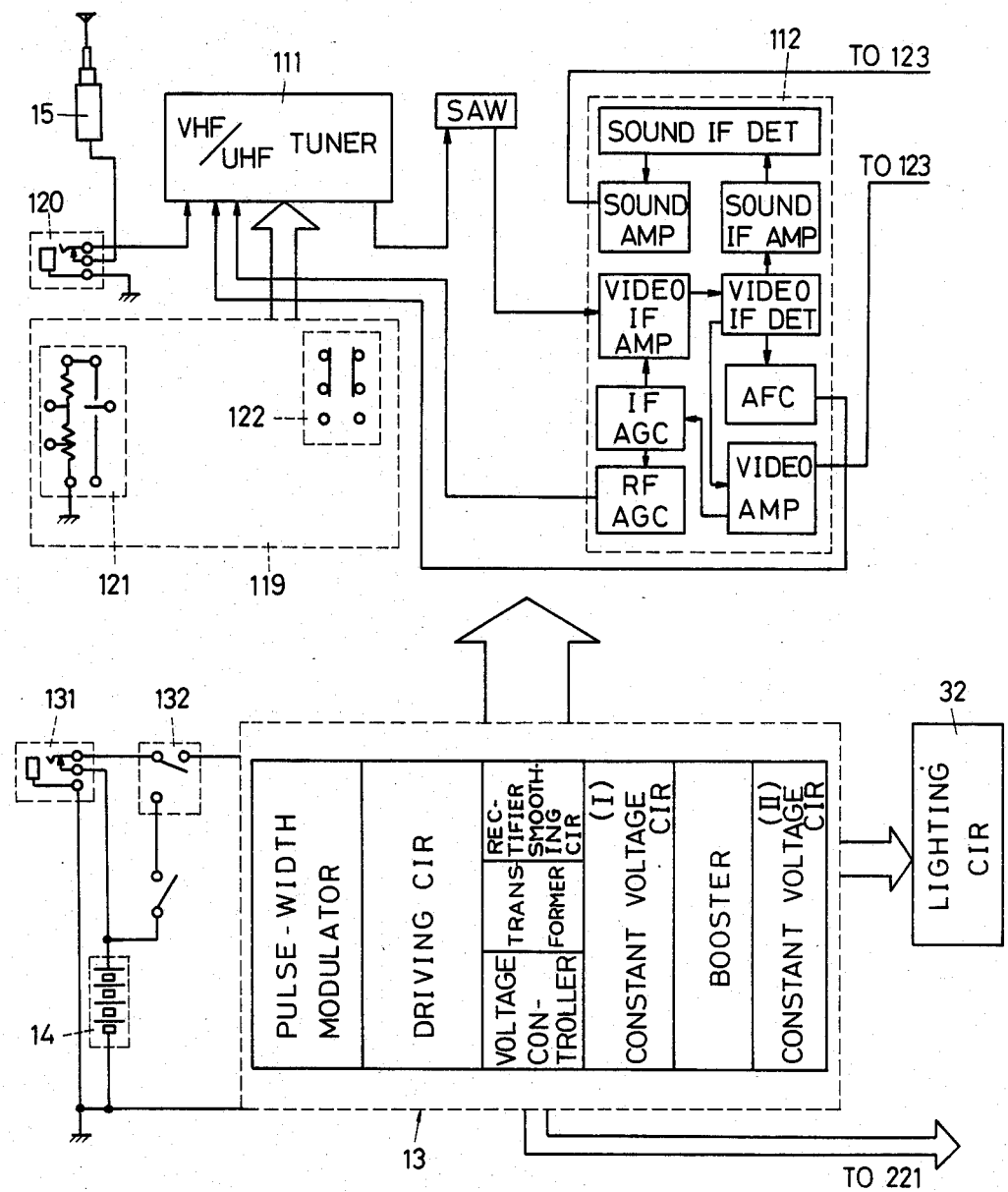
FIGS. 11a and 11b show a schematic block diagram of a system for the television receiver.
Figure 11B:
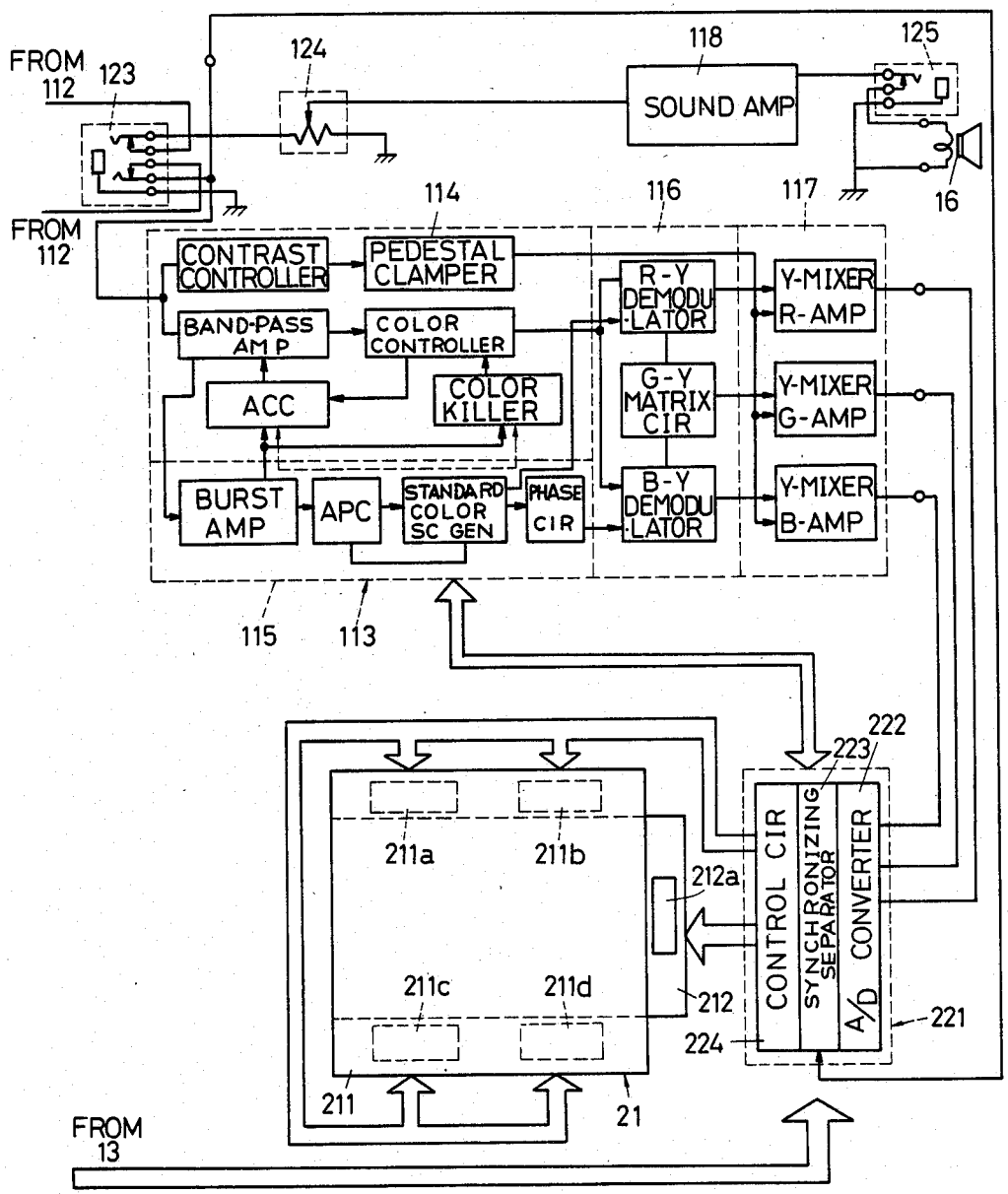

Referring to FIG. 3, a receiving circuit block 11 provided on the upper frame 101 comprises a substrate 129, a tuner 111 mounted on the substrate 129, a video and audio intermediate frequency signal processing circuit 112, a color signal reproducing circuit 113, and an audio amplifier 118, which are shown in FIG. 11, a channel tuning indicating mechanism 126, and jacks 123, 125. The tuner 111 is so disposed on the substrate 129 as to be positioned under the mirror 19. The jack 123 is provided for receiving a video signal and an audio signal from outside equipment. For example, a video camera is connected to the jack 123 to be used as a video monitor. The jack 125 is provided for connecting an earphone plug (not shown) for hearing an audio information. The jack is disposed near the audio device 16, an audio amplifier 118, and the volume dial 183, so that high density disposition is provided by effective wiring, thereby improving the operability of the manipulating members. When the earphone plug is inserted into the jack 125, the output of the audio device 16 is changed from the speaker 103 to the jack 125 for the earphone. The channel tuning indicating mechanism 126 is disposed adjacent to the channel selector 182 and the band select switch 184. On a rear portion of the substrate 129, a connecting pattern 129a (FIG. 10) is provided for providing an electrical connection to the driving control circuit 22.

A power supply circuit 13 is provided in the left portion of the upper frame 101. A power supply jack 131 is provided for supplying power from a power source other than batteries, such as a battery pack, an A/C adapter, and a car battery adapter. Batteries 14 are mounted in a battery compartment 107 formed in the lower frame 102. The watch module 17 is disposed on the left side portion of the upper frame 101. Pushbuttons 171, 172 are arranged for inputting the time.

Figure 4:
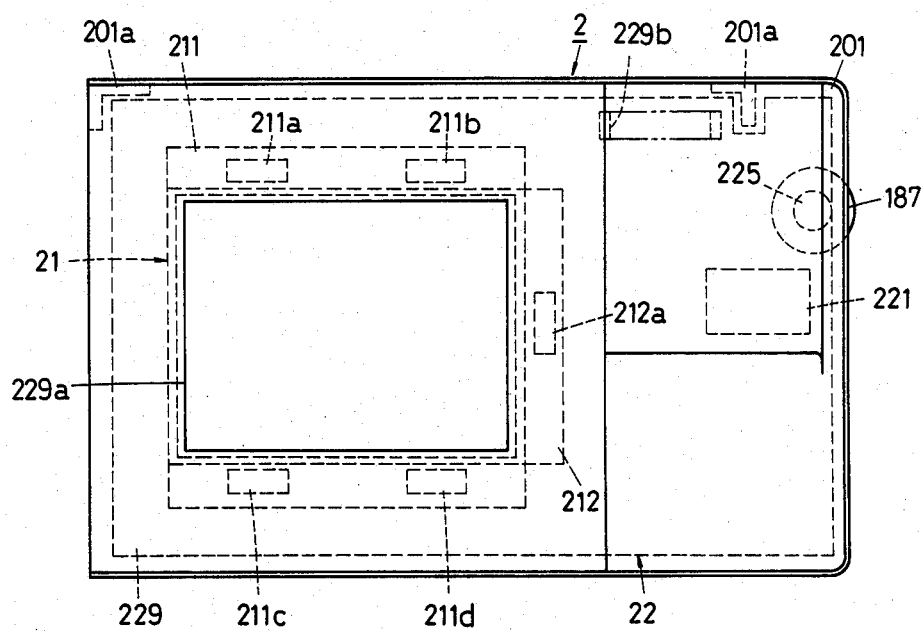
FIG. 4 is a plan view of a panel block.

Referring to FIG. 4, the panel block 2 comprises a panel frame 201, a substrate 229 secured to the frame 201, and the liquid crystal display panel 21 secured to the substrate 229. The liquid crystal display panel 21 comprises a transparent upper substrate 211, and a transparent lower substrate 212, with a liquid crystal material sealed therebetween. A color filter consisting of a red, green, blue pattern is secured to the lower substrate 212 by a thin glass plate, on which transparent scanning electrodes are formed. The respective projecting portions of the upper and lower substrate 211, 212 are provided with data electrodes driving circuits 211a, 211b, 211c, 211d and a scanning electrode driving circuit 212a. The liquid crystal display panel 21 is so disposed in the panel frame 201 that the display zone thereof corresponds to the mirror 19. The driving control circuit 22 comprises a substrate 229, an integrated circuit (IC) 221 mounted on the substrate 229, a crystal oscillator for producing standard pulses, a capacitor, a resistor, a transistor (not shown), and others. A brightness controlling dial 187 provided on the right side portion of the substrate 229 is integrated with a variable resistor 225 mounted on the substrate 229 so as to vary the voltage applied to the display panel 21 in order to adjust the brightness of the display surface. The substrate 229 has a window 229a corresponding to the display zone of the display panel 21 for transmitting the light. On a rear portion of the substrate 229, a connecting pattern 229b is provided for electrically connecting the circuit on the substrate 229 to the receiving circuit 11. A pair of shaft supports 201a are provided on both sides of the rear end portion of the panel frame 201. A pair of shaft supports 201b (FIG. 9) are provided for supporting the lighting block 3.

Figure 5:
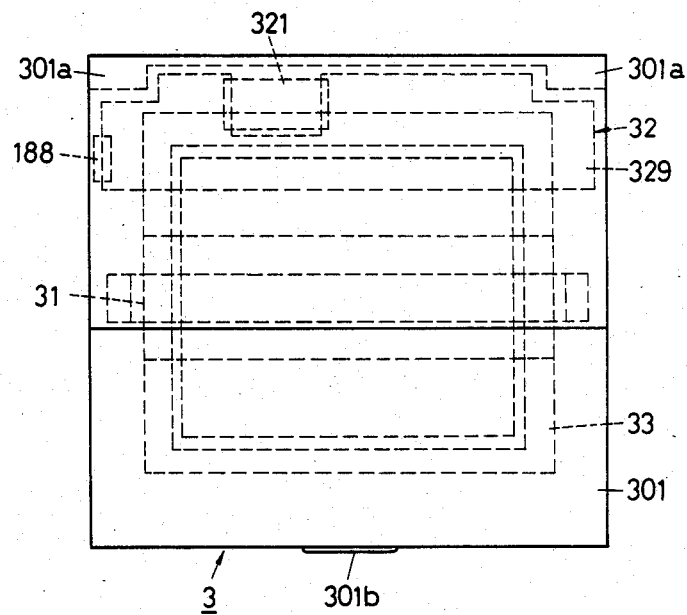
FIG. 5 is a plan view of a lighting block.

Referring to FIG. 5, the lighting block 3 comprises a lighting frame 301 having a pair of shaft supports 301a provided on both ends of the rear portion thereof, and a hook 301b provided on the front side of a central portion. The fluorescent lamp 31 having a circular cross-section is supported on the central portion of the lighting frame 301 by the flexible members (not shown). The lighting circuit 32 comprises a substrate 329 supported in the lighting frame 301, a transformer 321 secured to the substrate 329, a transistor, a capacitor, a resistor (not shown), and others. A reflector 33 is provided for effectively reflecting the light of the lamp 31 in the display panel 21 and uniformly lightening the display zone of the display panel 21. A light changing switch 188 is mounted on the left portion of the lighting frame 301 for changing the brightness of the lamp 31 by controlling the lighting circuit 32.

Figure 6:
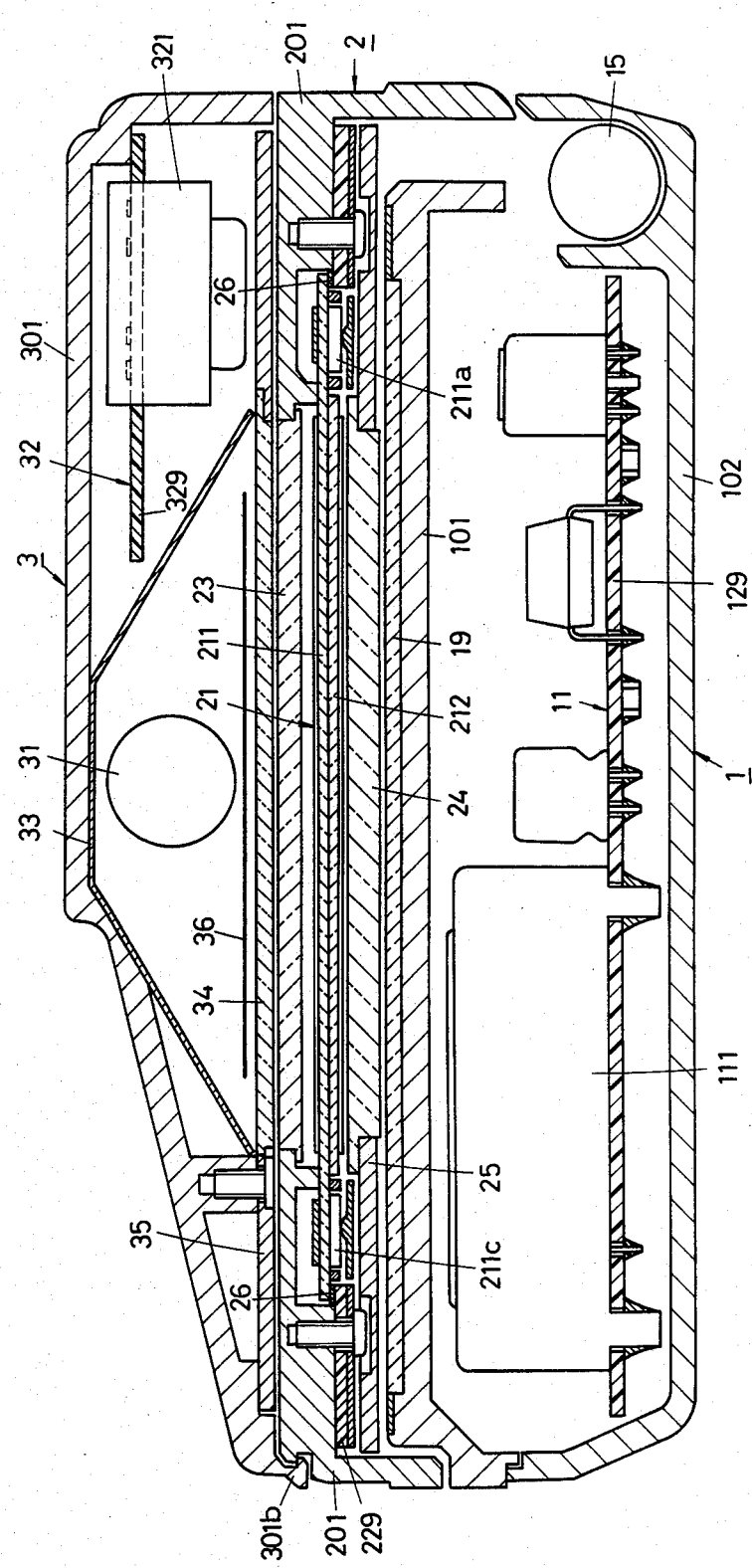
FIG. 6 is a sectional view of the television receiver taken along a line VI—VI of FIG. 2.

Referring to FIG. 6, a diffusion plate 23 is secured to the panel frame 201, and a transparent lower plate 24 is secured to a metallic panel supporting plate 25. The diffusion plate 23 and the transparent lower plate 24 are provided for protecting the display panel 21 and preventing the panel block 2 from becoming dusty. Further, when outside light is used (the lighting block 3 is opened), the plates serve to prevent the reflection of the ceiling or the sky by the mirror 19. A panel supporting plate 25 which covers the panel block 2 is provided for improving the strength of the panel block. The liquid crystal display panel 21 is electrically connected to the driving control circuit 22 by a connector 26. A diffusion plate 34 is fixed to a lighting frame supporting plate 35. A lighting curtain 36 is provided for unifying the brightness of the light at a portion close to the lamp 31 and a portion distant from the lamp 31.

In place of the circular fluorescent lamp, a plain shaped fluorescent lamp or another light emitting device such as an electroluminescent device can be employed.

Figure 7:
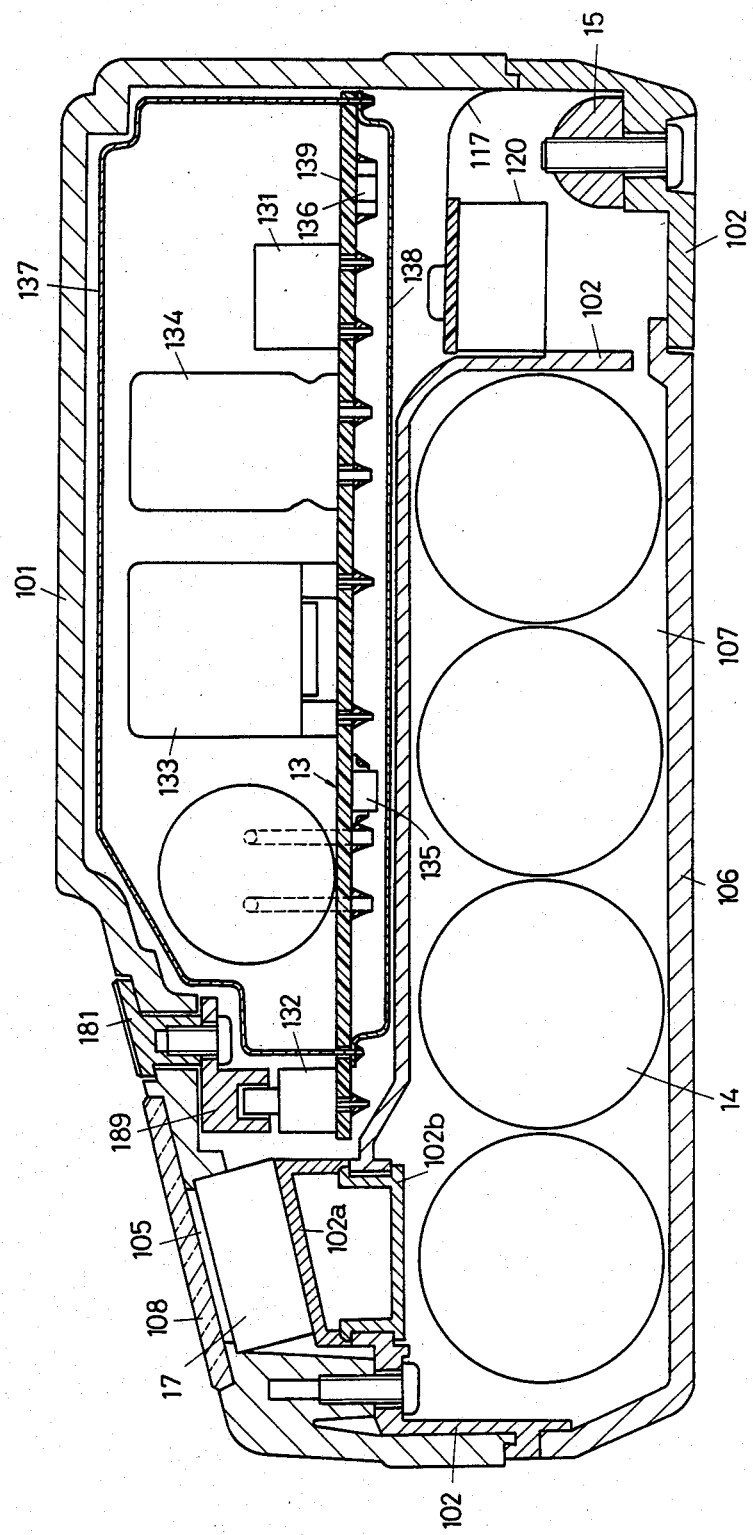
FIG. 7 is a sectional view taken along a line VII—VII of FIG. 2.

Referring to FIG. 7, a glass 108 is secured for the time display 105 provided on the upper frame 101. A power switch lever 189 connected to the power switch knob 181 by a screw is engaged with a power switch 132 so as to operate the power switch 132. The power switch lever 189 is provided with a button 189a (FIGS. 1 and 3). When the panel block 2 is closed after watching the television, the panel frame 201 (FIG. 6) pushes the button 189a (FIG. 3) so taht the lever 189 is moved to the left to automatically turn off the power switch 132.

The power supply circuit 13 comprises a transformer 133, a capacitor 134, a transistor 135 and a resistor 136. These electronic elements are mounted on a substrate 139 together with the power supply jack 131 and the power switch 132. Shield plates 137, 138 are provided for absorbing a noise produced from the power supply circuit 13 and for preventing electric interference with the receiving circuit 11.

The watch module 17 mounted on the upper frame 101 is supported by a support 102a mounted on the upper portion of the lower frame 102, on which a cover 102b of the module is mounted. A lid 106 for the battery compartment is snugly engaged with the lower frame 102. An external antenna jack 120 is provided for receiving a plug of an antenna other than the rod antenna 15, such as a wire antenna. If the plug of the other antenna is connected to the jack 120, the receiving circuit automatically changes to receive the signal received by the antenna.

Figure 8:
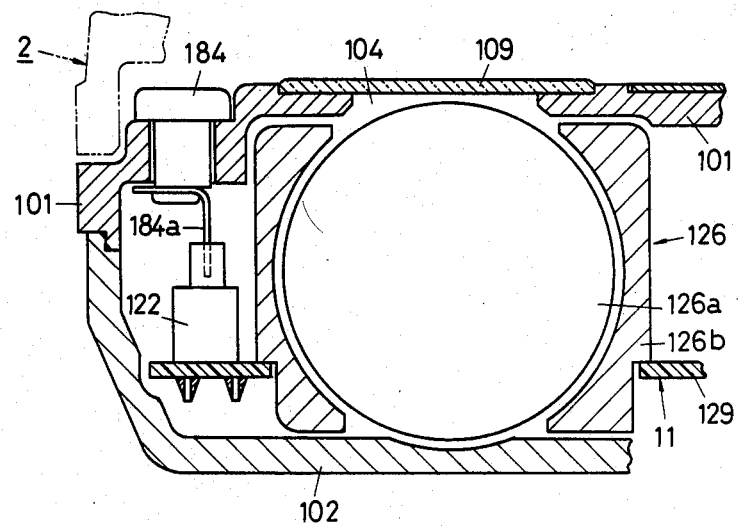
FIG. 8 is a sectional view taken along a line VIII—VIII of FIG. 2.

Referring to FIG. 8, a glass 109 is mounted on the upper frame 101, corresponding to channel tuning indicator 104. A connecting plate 184a engaged with the band selecting switch knob 184 by a screw is engaged with a band selecting switch 122 mounted on the substrate 129. The channel tuning indicator mechanism 126 comprises a tuning indicating drum 126a bearing markers printed thereon and a supporting frame 126b. The drum 126a is connected to the channel tuning dial 182 through a reduction gear train (not shown). The supporting frame 126b is further provided for positioning and supporting a volume 124 (FIG. 10) with the volume dial 183.

Figure 9:
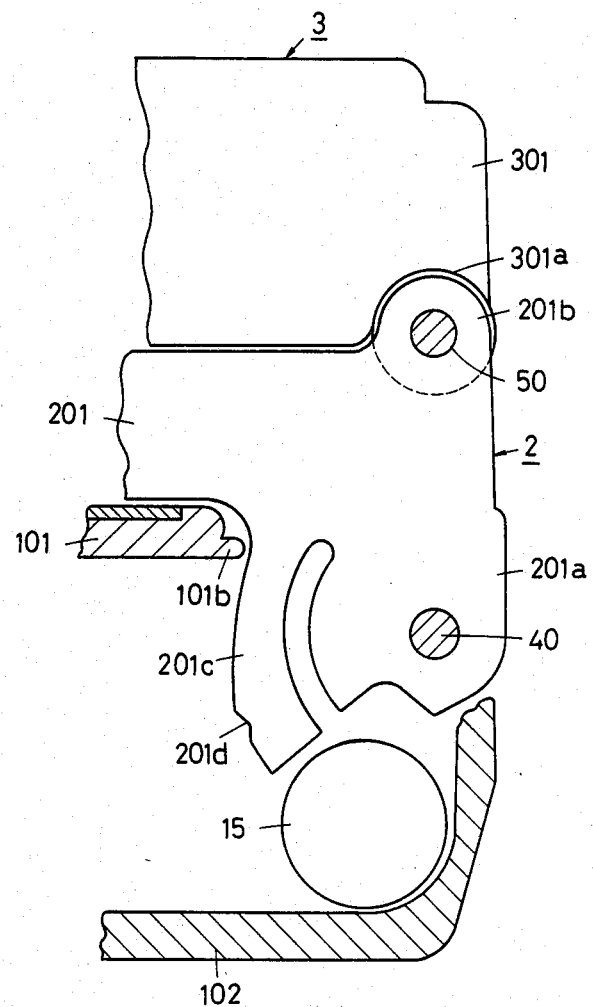
FIG. 9 is a sectional view of a pivot portion between the panel block and lighting block.

Referring to FIG. 9, a panel frame shaft 40 is rotatably engaged with supports 201a of panel frame 201 and 101a of upper frame 101 at a lower portion than the top of the upper frame 101 to pivotally connect both frames. The shaft 40 is axially locked by C-rings (not shown). An arm 201c having a positioning notch 201d is extended from the frame 201 adjacent to the support 201a of the frame 201. A projection 101b is formed on an end of the upper frame 101 so as to engage with the notch 201d. When the panel block 2 is opened, the projection 101b engages with the positioning notch 201d to hold the panel block 2 in an open state as shown in FIG. 1.

When the panel block 2 is closed, a hook 101c formed on a central portion of the upper frame 101 (FIGS. 1 and 3) is engaged with a front edge of the panel frame 201 to hold the panel block. In order to open the panel block 2, a button 101d integral with the hook 101c is pushed, so that the engagement of the hook 101c and the panel plate 201 is released.

The position of the shaft 40 is closely related to the position of the display panel 21, the shape of the substrate 229, and the position of the mirror 19. If the shaft 40 is disposed at a higher position than the position of FIG. 9, a reflecting point on the mirror moves to the front side of the upper frame 101 compared with the illustrated embodiment, which causes a decrease in the visible area. Alternatively, the display panel 21 may be disposed at a rear portion to shift the reflecting point rearwardly. However, such a disposition decreases the space for the circuit in the periphery of the window 229a of the substrate 229, which is disadvantageous in designing the circuit arrangement. In the present invention, the display panel 21 is disposed in the center of the panel frame 201 and the shaft 40 is positioned at the lowest position in the allowable range. The mirror 19 is so disposed that when the panel block 2 is opened, the mirror 19 is shielded by the front edge of the panel frame 201 to prevent the surface reflection of other things.

A shaft 50 provided on the upper portion of the shaft 40 is rotatably engaged with the supports 201b and 301a. As shown in FIG. 6, when the fluorescent lamp 31 is used, lighting block 3 is closed, at which a hook 301b is engaged with the panel frame 201. When the outside light is used, the hook 301b is pushed up by the band to release the engagement, and the lighting block 3 is opened. The panel block 2 is adapted to be held at an angle of 50° with the horizontal and the lighting block 3 is held at an angle of 90° with the panel block 2. By such arrangements, outside light is effectively used for watching the television without obstruction caused by the lighting block 3.

FIG. 10 shows connections of circuits provided in housing 1 and blocks 2 and 3. The voltage applied from batteries 14 to the power supply circuit 13 is stepped up and held at a constant voltage and distributed to the receiving circuit 11 and the lighting circuit 32. From the receiving circuit 11, the voltage is applied to the driving control circuit 22. The power supply circuit 13 is electrically connected to the lighting circuit 32 by means of a flexible substrate. The power supply circuit 13 is electrically connected to the receiving circuit 11 by a normal lead wire. The receiving circuit 11 further supplies a primary color signal and a video signal to the circuit 22 by a flexible substrate.

It has been found that a minimum surrounding brightness for watching the color television of the present invention without using the lighting lamp is about 2,000 luxes (approximately the brightness near a window on a cloudy day). This means that the television can be watched without using the lighting device, which consumes a great amount of power, for a comparatively long time during a day. In the present invention, the lighting device is mounted in the housing of the liquid crystal television receiver. Accordingly, it is possible to watch the television at any time and anywhere.

Referring to FIG. 11, the intermediate frequency signal processing circuit 112 comprises a video intermediate frequency amplifier, a video detector circuit, a video signal amplifier, an AGC circuit, a sound intermediate frequency amplifier, a sound detector circuit, and a sound frequency amplifier. The color signal reproducing circuit 113 comprises a band-pass amplifier 114, a color synchronizing circuit 115, a color demodulator 116, and a color signal amplifier 117. The sound amplifier 118 is provided between volume 124 and the earphone jack 125. A channel tuning control circuit 119 including channel tuning volume 121, and a band selecting switch 122 is provided for producing a channel tuning voltage corresponding to each channel. The power supply circuit 13 comprising a booster and a constant voltage circuit, functions to step up the voltage of the batteries 14 and to supply stabilized constant voltages. The driving control circuit 221 comprises an A/D converter 222, a synchronizing separator circuit 223, and a control circuit 224.

In operation, a television signal received by the rod antenna 15 is supplied to the tuner 111 through the external antenna jack 120. A designated channel is selected from the signal by the tuner 111 and the channel tuning control circuit 119, and converted into an intermediate frequency signal. The signal is applied to the intermediate frequency signal processing circuit 112 through an SAW filter. After amplification by the video intermediate frequency amplifier, the signal is detected as a video signal by the video detector circuit. Then, the video signal is amplified by the video signal amplifier, and applied through the A/V jack 123 to the color signal reproducing circuit 113 and the driving control circuit 221. The band-pass amplifier 114 derives a carrier chrominance signal including a color burst signal from the supplied video signal, and applies a carrier chrominance signal to the color demodulator 116 and a color burst signal to the color synchronizing circuit 115. The color synchronizing circuit 115 produces a standard sub-carrier on the basis of the color burst signal having a stable frequency, which is applied to the color demodulator 116. The carrier chrominance signal applied to the color demodulator 116 is processed with the standard sub-carrier and converted into a color difference signal which is supplied to the color signal amplifier 117. Then, the signal is converted to a luminance signal which is processed in the band-pass amplifier 114 to produce a primary color signal. The signal amplified in the amplifier 117 is applied to the A/D converter 222 of the driving control circuit 221.

Additionally, the video signal is applied to the synchronizing separator circuit 223 for separating a synchronizing signal. The control circuit 224 operates to control the synchronizing signal separated by the synchronizing separator circuit 223 and a synchronizing signal for operating the system so as to keep a predetermined relationship.

The A/D converter 222 applies signals to the data electrode driving circuits 211a, 211b, 211c, 211d. The output signals of the control circuit 224 are applied to the scanning electrode driving circuit 212a and the data electrode driving circuit 211a, 211b, 211c, 211d to drive the liquid crystal display panel 21. Thus, the video information is displayed on the display panel 21.

On the other hand, the video intermediate frequency signal applied to the video intermediate frequency amplifier of the intermediate frequency signal processing circuit 112 is amplified and applied to a 4.5 MHz detector circuit. By the 4.5 MHz detector circuit, a video signal and a sound intermediate frequency signal of 4.5 (MHz) which is a beat signal of sound intermediate signal are derived. The sound intermediate frequency signal is amplified in the sound intermediate frequency amplifier, and the amplifier signal is changed to an aural signal in the sound detector circuit. The aural signal is amplified in the sound amplifier and applied through the A/V jack 123 to the sound amplifier 118. The aural signal is amplified to a sufficient output level to drive the sound device 16. The amplified aural signal is applied through the earphone jack 125 to the sound device 16 so that the sound information is obtained.

In accordance with the present invention:

(1) Since the periphery of the mirror is shielded from the light by the panel block, surface reflection on the mirror is prevented. Thus, bright, good contrast picture quality is provided. Since the outside light is directly entered into the panel block, high lighting efficiency and, excellent picture quality are provided. The outside light is used for a long time, so that a long life of the battery is ensured.

(2) Since the lighting block is pivotally connected to the panel block, the changing of the use of the lighting device and outside light can be easily performed.

(3) Circuit means are provided in respective blocks so that electrical interference is prevented.

While the invention has been described in conjunction with preferred specific embodiments thereof, it will be understood that this description is intended to illustrate and not limit the scope of the invention, which is defined by the following claims.

What is claimed is:

1. A liquid crystal television receiver comprising:
   a first housing containing a television receiving circuit including, a tuner, a video and sound intermediate frequency signal processing circuit, and an electroacoustic transducer for converting an aural signal to sound, manipulating means for operating the television receiving circuit, a battery for driving the television receiving circuit, and a mirror mounted on an upper portion thereof;
   a second housing pivotally connected to the first housing including, a liquid crystal display panel, and a driving and controlling circuit for the liquid crystal display panel; and
   a third housing pivotally connected to the second housing including a light emitting element, and a driver for the light emitting element.

2. The liquid crystal television receiver according to claim 1 wherein the liquid crystal display panel is arranged to transmit light from the outside surroundings.

3. The liquid crystal television receiver according to claim 2 wherein the first, second and third housings are connected with each other at rear portions thereof, respectively.

4. The liquid crystal television receiver according to claim 3 wherein the third housing is arranged to cover the liquid crystal display panel.

5. The liquid crystal television receiver according to claim 3 wherein the second housing is connected to the first housing at a lower portion than the top of the first housing.

6. The liquid crystal television receiver according to claim 3 wherein the third housing is arranged to rotate together with the second housing.

* * * * *